(12) United States Patent
Sinelli et al.

(10) Patent No.: US 11,312,302 B2
(45) Date of Patent: Apr. 26, 2022

(54) MIRROR COMPONENT REAR VIEW ASSEMBLY AND VEHICLE

(71) Applicant: MOTHERSON INNOVATIONS COMPANY LIMITED, London (GB)

(72) Inventors: Gary Sinelli, Marysville, MI (US); Anthony P. D'Andrea, Marysville, MI (US); Tom Blossom, Marysville, MI (US); Kevin McCarthy, Marysville, MI (US)

(73) Assignee: Motherson Innovations Company Limited, London (GB)

( * ) Notice: Subject to any disclaimer, the term of this patent is extended or adjusted under 35 U.S.C. 154(b) by 252 days.

(21) Appl. No.: 16/739,618

(22) Filed: Jan. 10, 2020

(65) Prior Publication Data
US 2020/0223363 A1    Jul. 16, 2020

(30) Foreign Application Priority Data

Jan. 11, 2019 (DE) ...................... 10 2019 100 685.6

(51) Int. Cl.
*B60R 1/072* (2006.01)
(52) U.S. Cl.
CPC .................................. *B60R 1/072* (2013.01)
(58) Field of Classification Search
CPC ...................................................... B60R 1/072
USPC .......................................................... 359/877
See application file for complete search history.

(56) References Cited

U.S. PATENT DOCUMENTS

| | | | | |
|---|---|---|---|---|
| 4,930,370 A | * | 6/1990 | Yoshida | ................... B60R 1/072 359/873 |
| 2002/0024751 A1 | * | 2/2002 | Guttenberger | .......... B60R 1/072 359/879 |
| 2002/0041454 A1 | * | 4/2002 | Guttenberger | ............ B60R 1/07 359/877 |
| 2002/0063977 A1 | * | 5/2002 | Seichter | .................... B60R 1/07 359/877 |

(Continued)

FOREIGN PATENT DOCUMENTS

| | | |
|---|---|---|
| DE | 20111725 | 9/2001 |
| DE | 10161975 A1 | 7/2003 |

(Continued)

OTHER PUBLICATIONS

German Office Action dated Jul. 16, 2019 of the priority application DE 10 2019 100 685.6.

*Primary Examiner* — Ricky D Shafer
(74) *Attorney, Agent, or Firm* — Jones Day

(57) ABSTRACT

A mirror component for receiving an actuator for adjusting a rear view position of a rear view mirror element in a rear view device includes at least one anti-back-out rib element for receiving an electrical connector of the actuator and an electrical mating connector to an electrical supply architecture being connected to the electrical connector, the anti-back-out rib element being an element enabling receiving either at least a first combination or a second combination of the electrical connector being connected to the electrical mating connector, the first and second combinations being differently shaped, and the anti-back-out rib element being adapted to prevent assembly of the actuator to the mirror component in case of the electrical connector being incorrectly connected to the electrical mating connector.

17 Claims, 5 Drawing Sheets

(56) References Cited

U.S. PATENT DOCUMENTS

| | | | | |
|---|---|---|---|---|
| 2002/0171906 A1* | 11/2002 | Busscher | ............. | B60Q 1/2665 |
| | | | | 359/265 |
| 2009/0040306 A1* | 2/2009 | Foote | ................... | B60R 1/0602 |
| | | | | 348/148 |
| 2009/0115631 A1* | 5/2009 | Foote | ..................... | B60Q 1/525 |
| | | | | 340/901 |
| 2011/0317296 A1* | 12/2011 | Schmierer | ................. | B60R 1/07 |
| | | | | 359/871 |
| 2018/0131113 A1* | 5/2018 | LeVesque | ................. | B60R 1/04 |

FOREIGN PATENT DOCUMENTS

| | | |
|---|---|---|
| EP | 0989027 A2 | 3/2000 |
| WO | WO 2009/064186 A1 | 5/2009 |

* cited by examiner

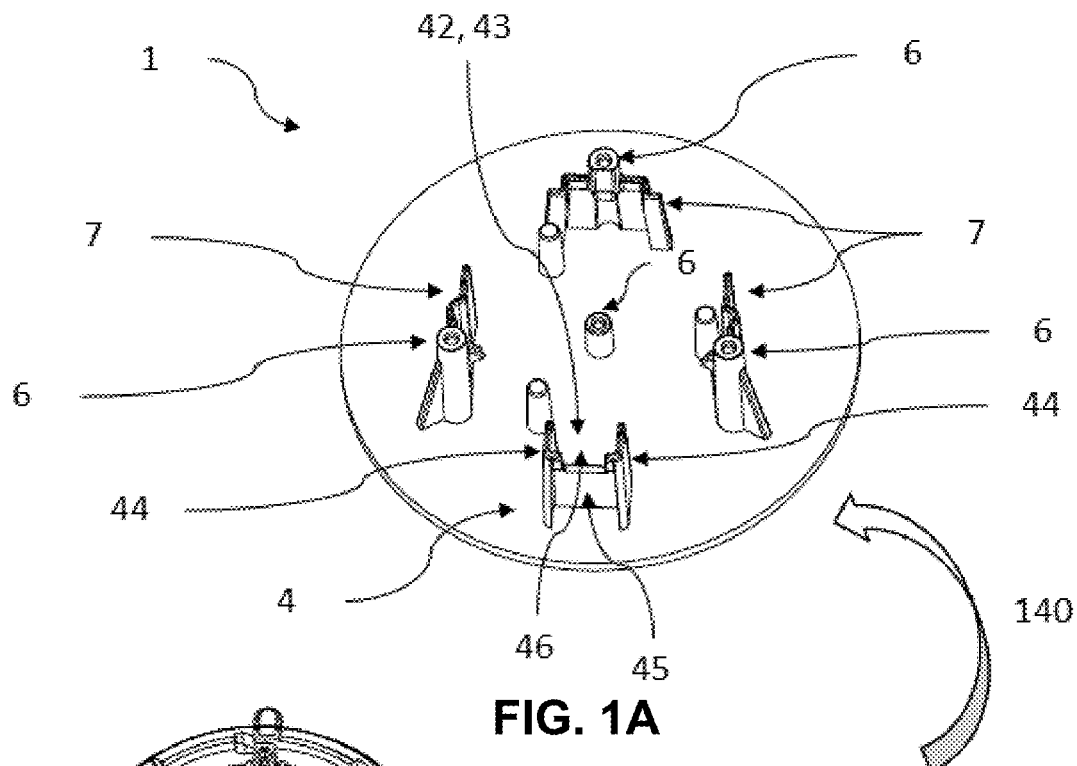
FIG. 1A
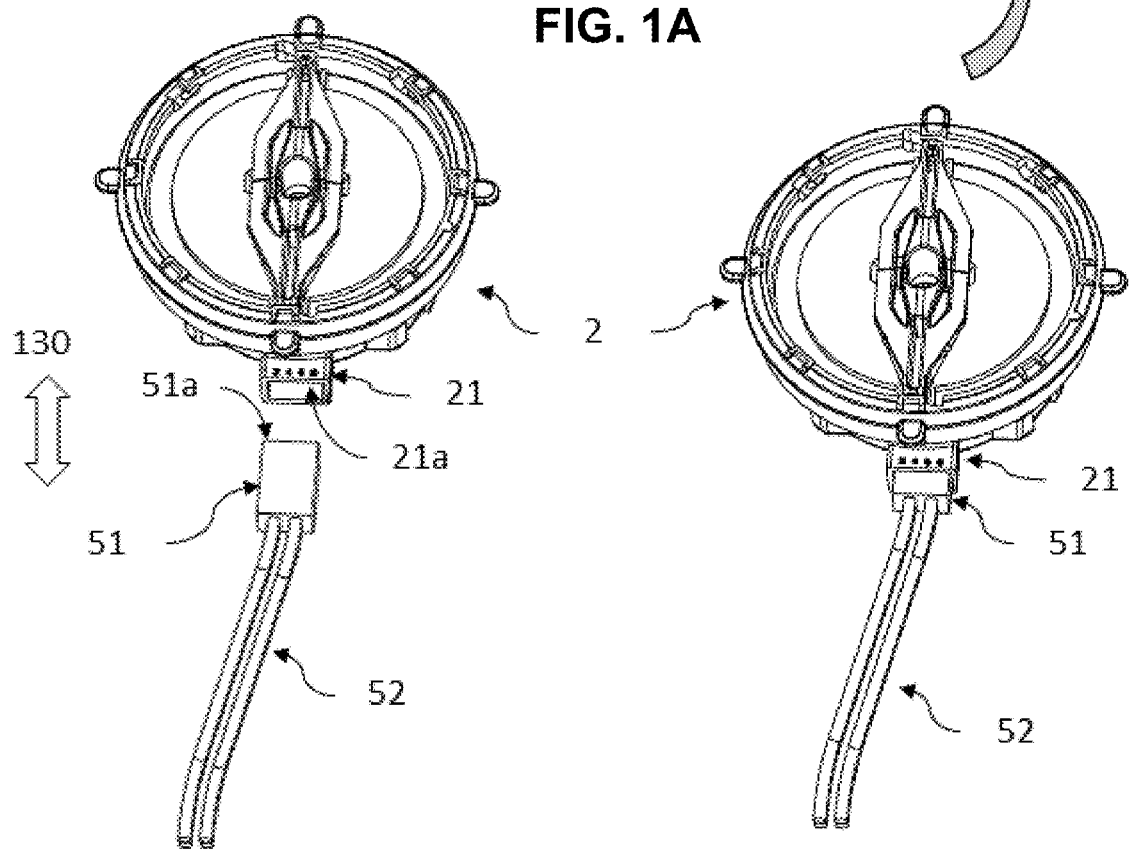
FIG. 1B  FIG. 1C

MIRROR COMPONENT REAR VIEW ASSEMBLY AND VEHICLE

CROSS-REFERENCE TO RELATED APPLICATION

This application claims the benefit of foreign priority to German Patent Application No. DE 10 2019 100 685.6, filed Jan. 11, 2019, which is hereby incorporated by reference in its entirety for all purposes.

BACKGROUND

1. Field of the Invention

The present disclosure relates to a mirror component with an anti-back-out rib element adapted to detect connection failures, to a rear view device with such a mirror component, to a vehicle with such a rear view device, and to a method of manufacturing such rear view devices.

2. Related Art

Exterior rearview mirrors frequently have electrical components integral to the design of the mirror. Wiring and a wire harness provide a connection of the electrical device within the exterior mirror to the main electrical architecture of the vehicle. The wire harness is usually produced by one manufacturer and the electrical devices are typically produced by different manufacturers. Thus the wire harness will include a connector at the terminus ends of the wires which mates with the associated receptacle on the electrical device within the mirror. Insuring proper connection during the assembly process of mirrors is of keen importance to the producer of the exterior mirror as well as the vehicle manufacturer. If connectors on the wire harness are not fully engaged with the mating connector of the electrical device, the device may not function properly.

EP 0989027 A2 describes an adjusting device for an exterior mirror for motor vehicles, comprising a drive housing, on which a mirror glass is mounted, which is mounted on a mirror glass carrier, wherein electrical wiring leads of the mirror glass carrier through a projection of the drive housing to the connector and that the mirror glass carrier is pivotally connected to the drive housing.

WO 2009/064186 A1 describes a mounting structure for mounting an adjustment instrument to a support for an exterior mirror unit, comprising first attachment parts on the adjustment instrument and second attachment parts on the support, the attachment parts being adapted to move the adjustment instrument relative to the support in a direction transverse to the adjustment instrument to fix the carrier.

DE 20111725 U1 describes an actuator, in particular for driving a vehicle rearview mirror, comprising a housing, at least one electric motor arranged therein, wherein ends of supply and/or control lines to the at least one electric motor and/or other electrical components within the housing are plugged into plug contacts.

DE 10161975 A1 describes an adjusting unit, in particular for motor vehicle rearview mirrors with an at least two-part housing of upper and lower shell, two in the lower shell of the housing fixed electric motors, each with a worm gear, which is in each case in operative connection with a gear, two of the respective gear driven rams engage in the conversion of the rotational movement in a depending on the direction of rotation reciprocating rectilinear motion, wherein the external thread on the spring tongues of the plunger each have a plurality of threads.

Electrical devices, such as glass actuators are frequently secured to the mirror assembly with one or more screws. In addition, it is common that the electrical connection of the wire harness connector to its mating connector on the actuator is completed prior to securing the actuator to the mirror assembly with the associated screws. It is also common for the mirror component that receives the actuator, frequently the case or case frame, to have a feature commonly known as an "anti-back-out rib". This is a feature strategically located such that if the wire harness electrical connector is not fully engaged within the connector on the actuator, the anti-back-out rib interferes with the connector during assembly, lifting up the actuator, and preventing the screw attachment to be made.

Glass actuators for rear view exterior mirrors are commonly available in two variants. The first common variant provides electrical function only, providing the user up/down and side-to-side adjustment. The second variant commonly available is an actuator that includes memory function. With this variant, the actuator has electrical function for adjustment of the glass in the up/down and side-to-side directions and also includes sensors, which detect the position of the glass. Glass actuators of the first variant have a three-wire connector and glass actuators of the second variant have an eight-wire connector. As a result, the size and geometry of these connectors is significantly different from each other.

SUMMARY

In an aspect, a mirror component for receiving an actuator for adjusting a rear view position of a rear view mirror element in a rear view device includes at least one anti-back-out rib element for receiving an electrical connector of the actuator and an electrical mating connector to an electrical supply architecture being connected to the electrical connector, the anti-back-out rib element is an element enabling receiving either at least a first combination or a second combination of the electrical connector being connected to the electrical mating connector, where the first and second combinations are differently shaped, and is adapted to prevent assembly of the actuator to the mirror component in case of the electrical connector is incorrectly connected to the electrical mating connector.

The anti-back-out rib element (or anti-back-our rib configuration) is capable of interfering with two or more different connector configurations (e.g. first and second combinations of electrical connector and corresponding mating connector) such that when connectors are not fully engaged with each other the anti-back-out rib element prevents the actuator from seating properly with other mounting features. This non-properly seat is a clear indication of a wrong established connection. Therefore assembly of the actuator to the mirror component is prevented by the anti-back-out rib element of the mirror component.

The mirror component acts as a mounting plate where the actuator is mounted to in a position defined by the position of one or more mounting means present on the mirror component and the corresponding mating mounting means of the actuator. Both mounting means only fit together in case of a correctly established combination of the electrical connector being connected to the electrical mating connector (correct electrical connection between the electrical connector and the corresponding electrical mating connector). The electrical connector of the actuator is rigidly fixed to the actuator in order to define the position of the actuator via the position of its electrical connector. The anti-back-out rib element is an element, where the position of the established connection between connector and mating connector depends on the correctness of this connection. In case of an incorrect connection, the position of the combination of the electrical connector being connected to the electrical mating connector is shifted in a way preventing mounting the actuator on the mirror component. Only in case of a correct combination (correct connection) of the electrical connector to the electrical mating connector, the mounting means of the mirror component (or mounting plate) and the corresponding mating mounting means of the actuator fit together enabling mounting the actuator to the mirror component. The actuator might be any actuator suitable to actuate the intended component. Furthermore, the anti-back-out rib element as the anti-back-out rib configuration provides flexibility to the manufacturing process because the anti-back-out rib element is executed as an element able to receive at least two different combination of the electrical connector being connected to the electrical mating connector. Therefore, the same mirror component can be used in at least two different production lines manufacturing rear view devices comprising different actuators having different electrical connectors. Here in one production line the first combination of the electrical connector being connected to the electrical mating connector can be inserted into the anti-back-out rib element in a first position, where in the other production line the second combination of the electrical connector being connected to the electrical mating connector (having a different shape compared to the first combination) can be inserted into the same anti-back-out rib element of the same mirror component in a second position. Therefore, the anti-back-out rib element provides two different mounting positions for receiving different combinations of the electrical connector being connected to the electrical mating connector. However, the anti-back-out rib element cannot receive both different combinations simultaneously but only one of the combinations of the electrical connector being connected to the electrical mating connector.

This provides an easy check for a correctly established electrical connection and prevents actuators mounted on the mirror component having non-correct electrical connections. Therefore, the present disclosure enables a fast error detection and error solving procedure during manufacturing of rear view devices by the claimed hardware measures.

In an embodiment the mirror component further includes one or more guiding structures arranged to receive the actuator only in an intended correct position achieved when the anti-back-out rib element receives one correctly established combinations of the electrical connector being connected to the electrical mating connector out of the different combinations of the electrical connector being connected to the electrical mating connector, where the anti-back-out rib element is adapted to. The guiding structures support the correct position of the actuator in case of a correct electrical connection between connector and mating connector and further support preventing mounting of actuators with non-correct electrical connections.

In another embodiment the anti-back-out rib element is adapted to at least partly enclose the electrical mating connector of the correctly established first or second combinations of electrical connector and electrical mating connector. The enclosure is adapted to receive only the correctly established connection between both connectors. The enclosure ensures that actuators with non-correctly established connections do not fit into the anti-back-out rib element preventing mounting actuators with non-correctly established connections. In a preferred embodiment the anti-back-out rib element is therefore adapted to enclose at least the mating connector on its side faces and the front side directed away from the actuator.

In another embodiment the anti-back-out rib element includes an opening within the front side, where a power cable to the electrical mating connector is fed through. The opening for the power cable makes mounting of the actuator with established connection easier.

In another embodiment the electrical connector has a connecting surface, where the mating connector is connected to, which laterally exceeds the corresponding connecting surface of the mating connector, where at least a part of at least one of the side faces of the anti-back-out rib element is adapted to be in direct contact to the connecting surface of the electrical connector when being inserted into the anti-back-out rib element. The size of the side faces are adapted to provide a cavity inside the anti-back-out rib element where only connectors with correct established connections between both connectors fit into. If the mating connector is not fully engaged with the electrical connector, the volume of the mating connector outside the electrical connector is too large to fit into cavity of the anti-back-out rib element. Therefore, if the side faces do not contact the connecting surface of the electrical connector, it is visible to the manufacturing staff that the connection is not correctly established.

In another embodiment the side faces in their upper regions facing away from the mirror component include a taper in the direction to the open side of the anti-back-out rib element. The taper will make mounting of the actuator with established connection between the connectors easier, because the connectors slide along the taper to reach the intended position within the anti-back-out rib element during mounting.

In another embodiment the side faces of the anti-back-out rib element are adapted to also at least partly enclose the electrical connector of the correctly established first or second combinations of electrical connector and electrical mating connector. The extended enclosure will even more prevent putting actuators with non-correctly established electrical connections into the anti-back-out rib element.

In another embodiment the anti-back-out rib element includes an open top surface and an open side facing towards the actuator for inserting the established first or second combinations of electrical connector and electrical mating connector into the anti-back-out rib element. The open sides makes mounting easier because the actuator with established connection can be put into the anti-back-out rib element simply from the top side by pressing it into the anti-back-out rib element. However the material of the anti-back-out rib element has to be rigid enough preventing pressing of actuators into the anti-back-out rib element having a non-correctly established connection between electrical connector and electrical mating connector.

In another embodiment the mirror component further comprising at least one mounting element to fix the actuator to the mirror component. The at least one mounting element has a defined position, which can only be received by corresponding mounting means of the actuator in case of a correctly established electrical connection between the connector and the mating connector. In a preferred embodiment the mirror component includes three mounting elements providing a secure and tight position of the actuator after being mounted to the mirror component. In a preferred embodiment the mounting element is a mounting screw boss to receive screws fixing the actuator to the mounting screw boss enabling fast and secure mounting.

The present disclosure further relates to a rear view device comprising a rear view mirror element, which rear view position is adjustable via an actuator arranged on a mirror component according to the present disclosure. The rear view device can be manufactured with a lower amount of rejected products due to non-correct electrical connections because the a mirror component according to the present disclosure provides an easy check for a correctly established electrical connection and enables a fast error detection and error solving procedure during manufacturing of rear view devices.

In an embodiment the mirror component is a backing plate, where the rear view mirror element is attached.

In another embodiment the mirror component is fixed to a case frame attached to a housing of the rear view device.

In another aspect, a vehicle includes at least one rear view device according to the present disclosure.

In another aspect, a method for inserting an actuator into a mirror component, includes: providing an actuator for adjusting a rear view position of a rear view mirror element in the rear view device, where the actuator includes an electrical connector; providing an electrical mating connector to an electrical supply architecture; inserting the electrical mating connector into the electrical connector to establish a combination of the electrical connector being connected to the electrical mating connector and subsequently an electrical connection between the actuator and the electrical supply architecture; inserting the connected actuator into an anti-back-out rib element of the mirror component as a variable element enabling receiving either at least a first combination or a second combination of the electrical connector being connected to the electrical mating connector, where the first and second combinations are differently shaped, and where the combination of the electrical connector being connected to the electrical mating connector is inserted into one position in the anti-back-out rib element dedicated for the particular combination of the electrical connector being connected to the electrical mating connector of the at least two differently shaped combinations; finalizing the attaching in case of the electrical mating connector is inserted into the electrical connector correctly; or preventing the attaching by the anti-back-out rib element regardless of which of the differently shaped combinations of the electrical connector being connected to the electrical mating connector being acceptable for the anti-back-out rib element is present in case of the electrical connector is incorrectly connected to electrical mating connector.

The method provides an easy check for a correctly established electrical connection and prevents actuators mounted on the mirror component having non-correct electrical connections. Therefore, the present invention enables a fast error detection and error solving procedure during manufacturing of rear view devices by the claimed hardware measures.

In an embodiment, the method further includes checking the combination of the electrical connector being connected to the electrical mating connector is case of the previously prevented attaching by the anti-back-out rib element, followed by either replacing the electrical connector and/or the electrical mating connector by another parts; or establishing a correct combination of the electrical connector being connected to the electrical mating connector of the former non-correct combination of the electrical connector being connected to the electrical mating connector.

The above listed embodiments can be used individually or in any combination to provide the device and the process in accordance with the invention.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

FIG. 1A is a schematic perspective view of an embodiment of the mirror component without a mounted actuator.

FIG. 1B is a schematic perspective view of an embodiment of the mirror component where the electrical connection for the actuator is established separately from the mirror component.

FIG. 1C is a schematic perspective view of an embodiment of the mirror component where the actuator with established electrical connection is mounted to the mirror component.

DETAILED DESCRIPTION

Figure 2A:
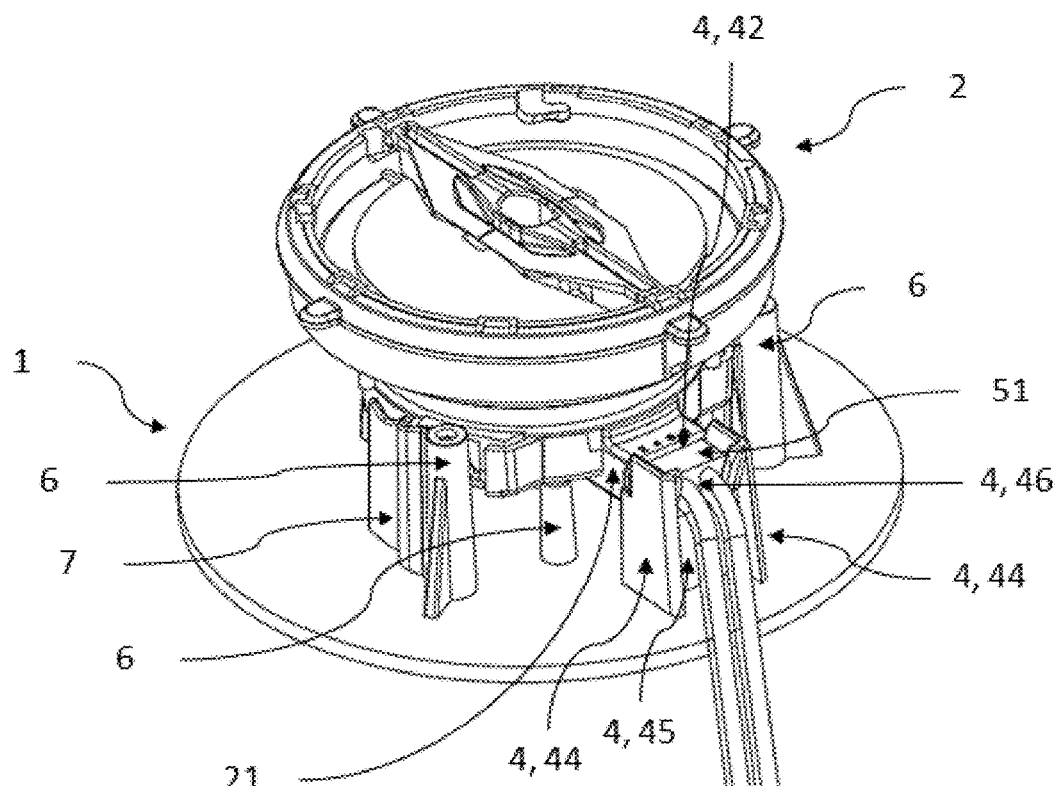
FIG. 2A is a schematic perspective view of an embodiment of the mirror component of FIG. 1 with a mounted actuator having a correctly established electrical connection.

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

FIGS. 1A, 1B, and 1C are schematic perspective views of an embodiment of the mirror component 1 (a) without mounted actuator 2, where (b) the electrical connection for the actuator 2 will be established 130 separately from the mirror component 1 and (c) the actuator 2 with established electrical connection is mounted 140 to the mirror component 1. Here, the mirror component 1 includes one anti-back-out rib element 4 for receiving an electrical connector 21 of the actuator 2 and an electrical mating connector 51 to an electrical supply architecture 5 being connected to the electrical connector 21, where the anti-back-out rib element 4 is a variable element enabling receiving either at least a first combination or a second combination of the electrical connector being connected to the electrical mating connector 21, 51, where the first and second combinations are differently shaped, and is adapted to prevent assembly of the actuator 2 to the mirror component 1 in case of the electrical connector 21 is incorrectly connected to the electrical mating connector 51. The mirror component 1 further includes three guiding structures 7 arranged to receive the actuator 2 only in an intended correct position achieved when the anti-back-out rib element 4 receives one correctly established combinations of the electrical connector being connected to the electrical mating connector 21, 51 out of the different combinations of the electrical connector being connected to the electrical mating connector 21, 51, where the anti-back-out rib element 4 is adapted to. The mirror component 1 further includes four mounting elements 6 to fix the actuator 2 to the mirror component 1. Three of the mounting elements 6 arranged at outer positions on the mirror component 1 are provided as clip connections, where corresponding means snap into the clip connections. The mounting element 6 arranged at the center of the mirror component 1 is a mounting screw boss to receive a screw fixing the actuator 2 to the mounting screw boss 6. The anti-back-out rib element 4 is adapted to enclose at least the mating connector 51 on its side faces 44 and the front side 45 directed away from the actuator 2 in case of the correctly established first or second combinations of electrical connector and electrical mating connector 21, 51. The anti-back-out rib element 4 further includes an opening 46 within the front side 45, where the power cable 52 to the electrical mating connector 51 is fed through. Depending on the used connectors the power cable might be a three-wire or an eight-wire cable 52. The anti-back-out rib element 4 further includes an open top surface 42 and an open side 43 facing towards the actuator 2 for inserting the established first or second combinations of electrical connector and electrical mating connector 21, 51 into the anti-back-out rib element 4. As shown in FIG. 1B, the electrical connector 21 has a connecting surface 21a, where the mating connector 51 is connected to, which laterally exceeds the corresponding connecting surface 51a of the mating connector 51. The anti-back-out rib element 4 and/or the mounting elements 6 and/or the guiding structures 7 might be separate elements mounted to the mirror element 1. Alternatively, the mounting element includes the anti-back-out rib element 4 and/or the mounting elements 6 and/or the guiding structures 7 as a single piece component. All components and elements might be made of plastic and might be manufactured by injection moulding as separate or single piece components.

Figure 2B:
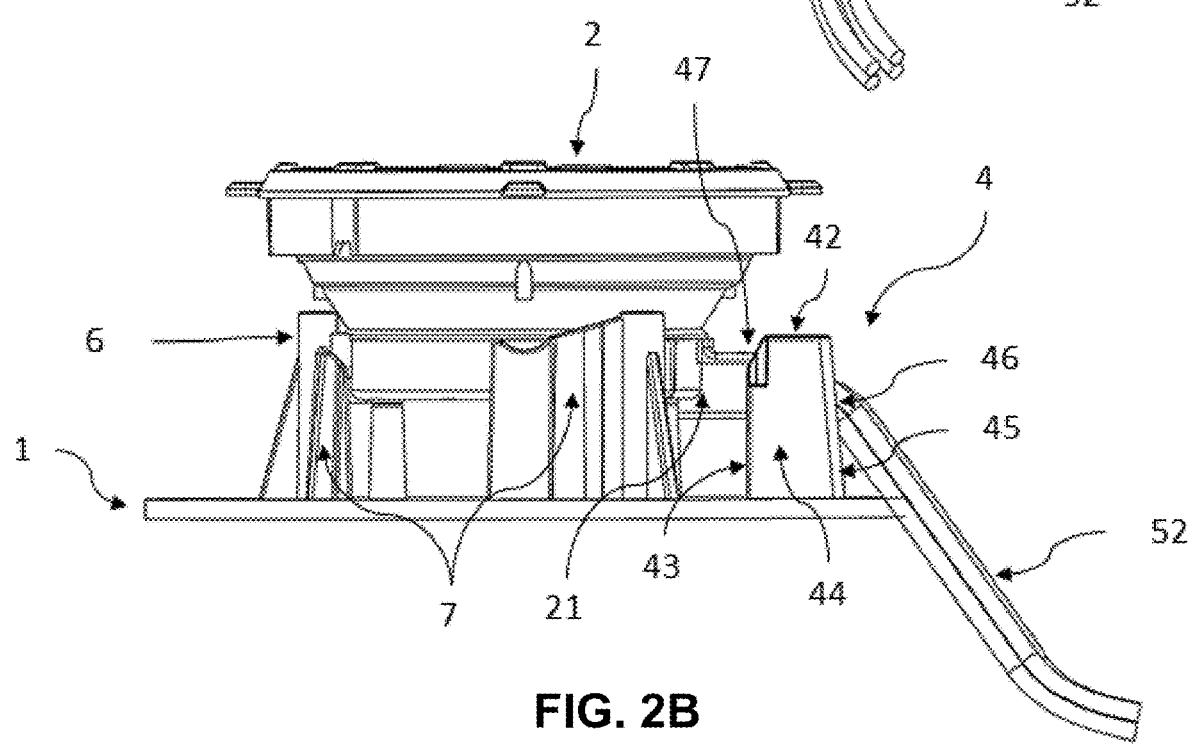
FIG. 2B is a schematic side view of an embodiment of the mirror component of FIG. 1 with a mounted actuator having a correctly established electrical connection.

FIGS. 2A and 2B show a schematic perspective view of an embodiment of the mirror component 1 of FIG. 1 with mounted actuator 2 having a correctly established electrical connection (a) in a perspective view and (b) in a side view. Here the electrical connector 21 has a connecting surface 21a, where the mating connector 51 is connected to, which laterally exceeds the corresponding connecting surface 51a of the mating connector 51, where the side faces 44 of the anti-back-out rib element 4 are adapted to be in direct contact to the connecting surface 21a of the electrical connector 21 when being inserted into the anti-back-out rib element 4, where its front surfaces abutting the connecting surface 21a in the direction of the actuator 2. Furthermore, the side faces 44 in their upper regions facing away from the mirror component 1 include a taper 47 in the direction to the open side 43 of the anti-back-out rib element 4. During mounting the connectors 21, 51 can slide along the taper 47 to reach its final position inside the anti-back-out rib element 4. Here, the side faces 44 of the anti-back-out rib element 4 also partly enclose the electrical connector 21 of the correctly established first or second combinations of electrical connector and electrical mating connector 21, 51. Furthermore the anti-back-out rib element 4 includes an open top surface 42 and an open side 43 facing towards the actuator 2 to enable easy inserting of the established first or second combinations of electrical connector and electrical mating connector 21, 51 into the anti-back-out rib element 4.

Figure 3A:
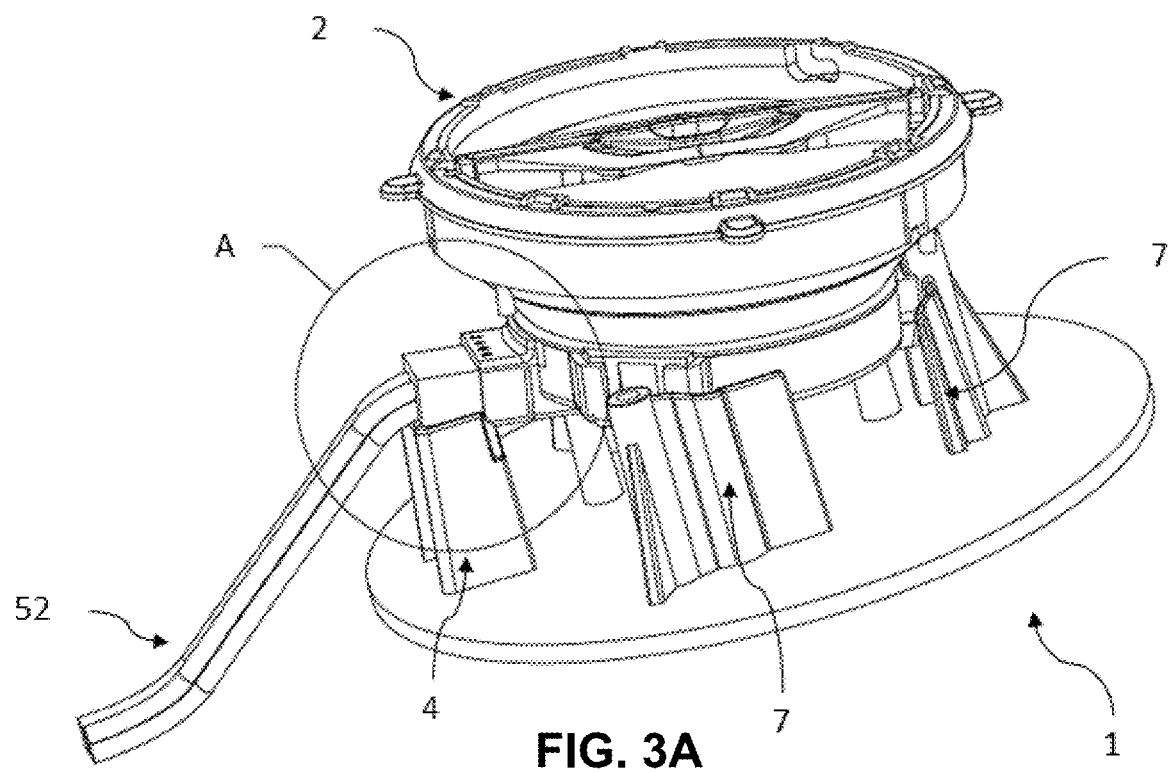
FIG. 3A is a schematic perspective view of an embodiment of the mirror component of FIG. 1 with failed mounting of an actuator with a non-correctly established electrical connection.
Figure 3B:
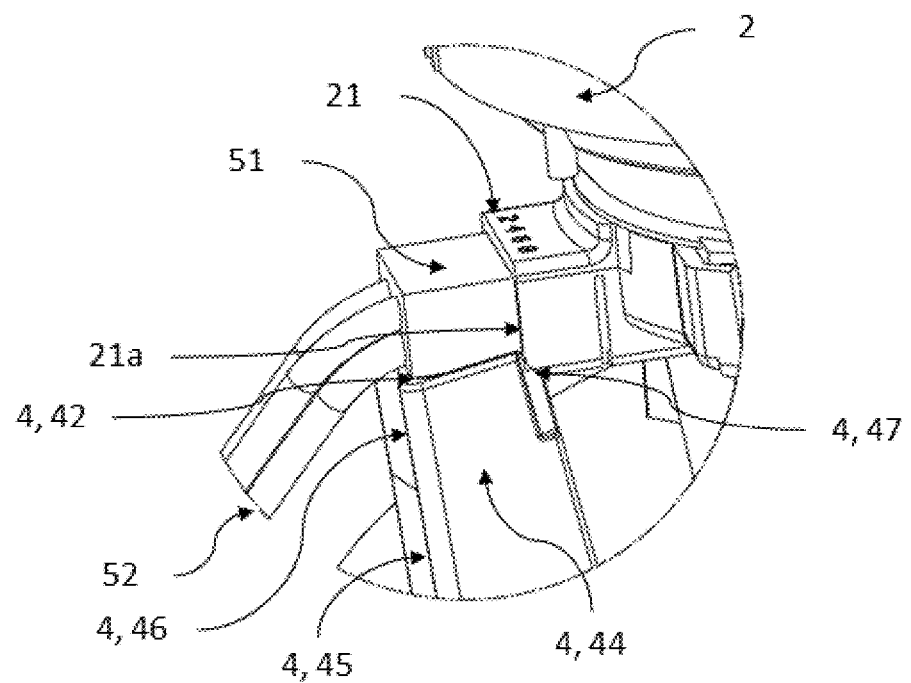
FIG. 3B is a schematic perspective view of an embodiment of the mirror component of FIG. 1 with failed mounting of an actuator with a non-correctly established electrical connection in an enlarged representation for the section A shown in FIG. 3A.

FIGS. 3A and 3B show a schematic perspective view of an embodiment of the mirror component 1 of FIG. 1 with failed mounting of an actuator 2 having a non-correctly established electrical connection (a) in a perspective view and (b) in an enlarged representation for the section A shown in FIG. 3(a). If the mating connector 51 is not fully inserted into the electrical connector 21, the volume of the mating connector 51 outside the electrical connector 21 is too large to fit into cavity of the anti-back-out rib element 1 established by the side faces 44 and the front side 45 in combination with the guiding structures 7 holding the actuator 2 in its intended position in case of a correct established electrical connection. Here, the non-correct connection prevents the actuator from being inserted into the anti-back-our rib element 4. This impossibility to mount the actuator 2 to the mirror component 1 is a clear indication that the connection between connector 21 and mating connector 51 is not correct and has to be checked and corrected.

Figure 4:
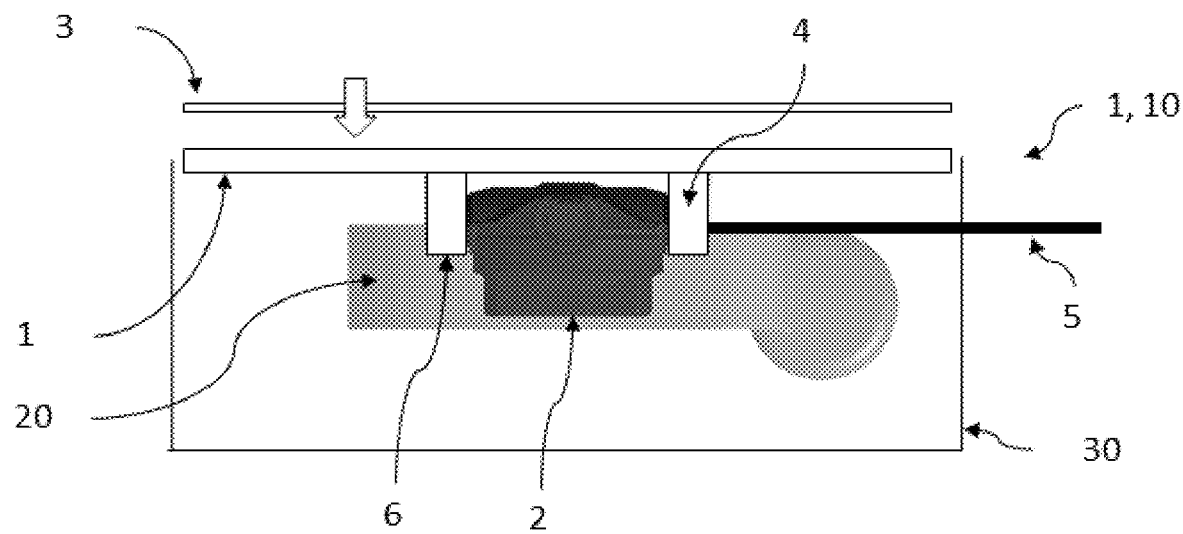
FIG. 4 is a schematic view of an embodiment of a rear view device according to an example of the present disclosure.

FIG. 4 shows a schematic view of an embodiment of a rear view device 10 in a top view. The rear view device 10 includes a rear view mirror element 3, which rear view position is adjustable via an actuator 2 arranged on a mirror component 1. Here the mirror component 1 is a backing plate, where the rear view mirror element 3 is attached to (indicated by the arrow). Furthermore the mirror component 1 is fixed to a case frame 20 attached to a housing 30 of the rear view device 10. The housing encloses the case frame 20, the backing plate 1 and the actuator 2 mounted on the backing plate. A wiring and a wire harness provide a connection of the actuator within the exterior mirror to the main electrical architecture of the vehicle 50 via the mating connector 51 of the electrical supply architecture 5 establishing the electrical connection (combination) with the connector 21 of the actuator 2.

Figure 5:
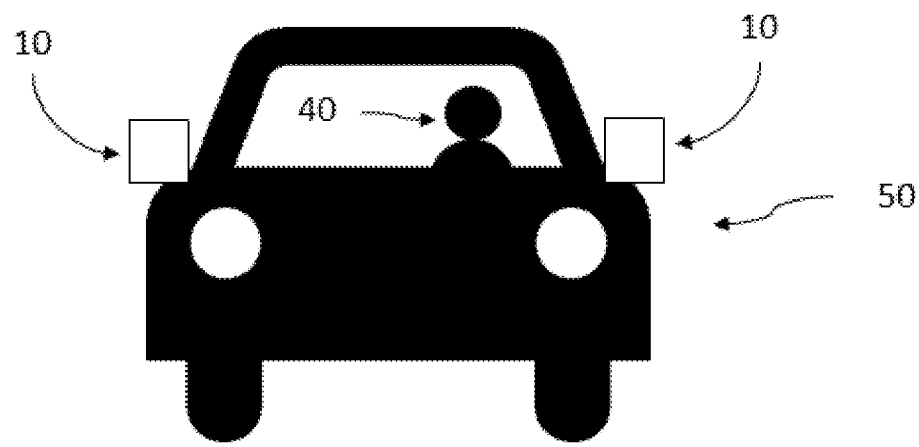
FIG. 5 is a schematic view of an embodiment of a vehicle having rear view devices according to an example of the present disclosure.

FIG. 5 shows a schematic view of an embodiment of a vehicle 50 having rear view devices 10 in a front view of the vehicle 50. Here a rear view device 10 is attached on each side (driver side and passenger side) of the vehicle 50. In other embodiments the rear view device 10 might be only attached to one side of the vehicle 50, preferably the driver side.

Figure 6:
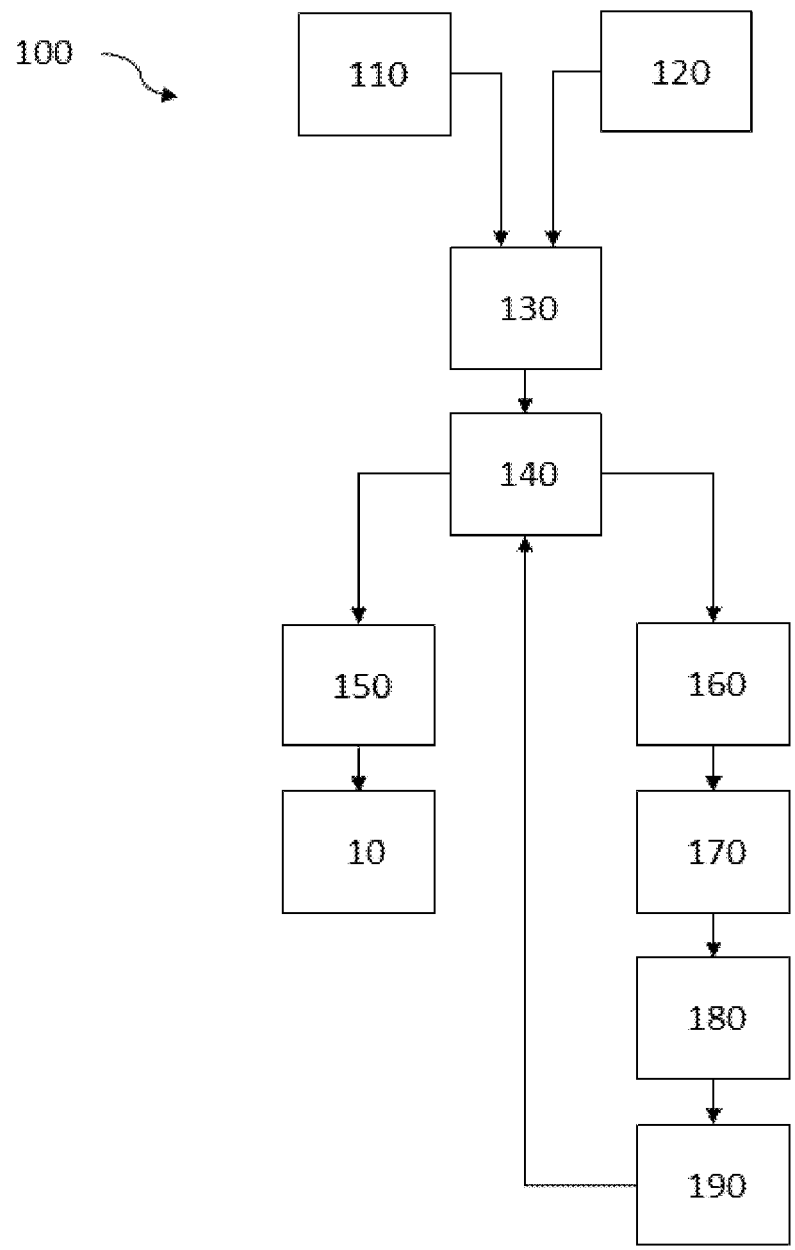
FIG. 6 is an embodiment of a method for manufacturing a rear view device according to an example of the present disclosure.

FIG. 6 shows an embodiment of the method 100 for manufacturing a rear view device 10 including the steps of providing 110 an actuator 2 for adjusting a rear view position of a rear view mirror element 3 in the rear view device 10, where the actuator includes an electrical connector 21; providing 120 an electrical mating connector 51 to an electrical supply architecture 5; inserting 130 the electrical mating connector 51 into the electrical connector 21 to establish a combination of the electrical connector being connected to the electrical mating connector 21, 51 and subsequently an electrical connection between the actuator and the electrical supply architecture; attaching 140 the connected actuator 2 to an at least one anti-back-out rib element 4 of the mirror component 1 as a variable element enabling receiving either at least a first combination or a second combination of the electrical connector being connected to the electrical mating connector 21, 51, where the first and second combinations are differently shaped, and where the combination of the electrical connector being connected to the electrical mating connector 21, 51 is inserted into one position in the anti-back-out rib element 4 dedicated for the particular combination of the electrical connector being connected to the electrical mating connector 21, 51 of the at least two differently shaped combinations; finalizing 150 the attaching in case of the electrical mating connector 51 is inserted into the electrical connector 21 correctly or preventing 160 the attaching by the anti-back-out rib element 4 regardless of which of the differently shaped combinations of the electrical connector being connected to the electrical mating connector 21, 51 being acceptable for the anti-back-out rib element 4 is present in case of the electrical connector 21 is incorrectly connected to electrical mating connector 51. In case of the prevented attaching the method 100 may comprising the further steps of checking 170 the combination of the electrical connector being connected to the electrical mating connector 21, 51 is case of the previously prevented 160 attaching by the anti-back-out rib element 4, followed by either replacing 180 the electrical connector and/or the electrical mating connector by another parts or establishing 190 a correct combination of the electrical connector being connected to the electrical mating connector 21, 51 of the former non-correct combination of the electrical connector being connected to the electrical mating connector 21, 51.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

LIST OF REFERENCE NUMERALS 1 mirror component according to the present invention
2 actuator to adjust the rear view position of the rear view mirror element
21 electrical connector of the actuator to receive an electrical connector
21a surface of the electrical connector facing towards the electrical mating connector (connecting surface)
3 rear view mirror element
4 anti-back-out rib element
41 cavity defined by the partly enclosure for the correctly established first or second combinations of electrical connector and electrical mating connector
42 open top surface of the cavity
43 open side facing towards the actuator
44 side face(s) of the anti-back-out rib element
45 front side of the anti-back-out rib element facing away from the actuator
46 opening in the anti-back-out rib element
47 taper of the side faces
5 electrical supply architecture
51 electrical mating connector of the electrical supply architecture
51a surface of the electrical mating connector facing towards the electrical connector (connecting surface)
52 power cable connected to the electrical mating connector
6 mounting element, e.g. a mounting screw boss
7 guiding structure
10 rear view device according to the present invention
20 case frame
30 housing
40 driver
50 Vehicle according to the present invention
100 A method for manufacturing a rear view device according to the present invention
110 Providing an actuator
120 Providing a mating connector
130 Insert the mating connector into the connector
140 inserting the connected actuator to the anti-back-out rib element
150 finalizing the attaching in case of correct combination connector—mating connector
160 preventing the attaching in case of incorrect combination connector—mating connector
170 checking the combination of connector—mating connector
180 replacing the connector and/or the mating connector by another parts
190 establishing a correct combination of connector—mating connector

What is claimed is:

1. A mirror component for receiving an actuator for adjusting a rear view position of a rear view mirror element in a rear view device, comprising:
at least one anti-back-out rib element for receiving an electrical connector of the actuator and an electrical mating connector to an electrical supply architecture being connected to the electrical connector,
wherein the anti-back-out rib element is an element enabling receiving either at least a first combination or a second combination of the electrical connector being connected to the electrical mating connector, the first and second combinations being differently shaped, and the anti-back-out rib element is adapted to prevent assembly of the actuator to the mirror component in case of the electrical connector being incorrectly connected to the electrical mating connector.

2. The mirror component of claim 1, further comprising one or more guiding structures arranged to receive the actuator only in an intended correct position achieved when the anti-back-out rib element receives one correctly established combination of the electrical connector being connected to the electrical mating connector out of the different combinations of the electrical connector being connected to the electrical mating connector, the anti-back-out rib element being adapted to the one or more guiding structures.

3. The mirror component of claim 1, wherein the anti-back-out rib element is adapted to at least partly enclose the electrical mating connector of the correctly established first or second combinations of electrical connector and electrical mating connector.

4. The mirror component of claim 3, wherein the anti-back-out rib element is adapted to enclose at least the mating connector on its side faces and a front side directed away from the actuator.

5. The mirror component of claim 4, wherein the anti-back-out rib element comprises an opening within the front side, and a power cable is fed through to the electrical mating connector.

6. The mirror component of claim 4, wherein the electrical connector comprises a connecting surface where the mating connector is connected to, which laterally exceeds the corresponding connecting surface of the mating connector, and at least a part of at least one of the side faces of the anti-back-out rib element is adapted to be in direct contact with the connecting surface of the electrical connector when inserted into the anti-back-out rib element.

7. The mirror component of claim 4, wherein the side faces in the upper regions facing away from the mirror component comprise a taper in a direction toward an open side of the anti-back-out rib element.

8. The mirror component of claim 4, wherein the side faces of the anti-back-out rib element are adapted to also at least partly enclose the electrical connector of the correctly established first or second combinations of electrical connector and electrical mating connector.

9. The mirror component of claim 3, wherein the anti-back-out rib element comprises an open top surface and an open side facing towards the actuator for inserting the established first or second combinations of electrical connector and electrical mating connector into the anti-back-out rib element.

10. The mirror component of claim 1, further comprising at least one mounting element to fix the actuator to the mirror component.

11. The mirror component of claim 10, wherein the mounting element is a mounting screw boss to receive screws fixing the actuator to the mounting screw boss.

12. A rear view device, comprising:
the mirror component of claim 1; and
a rear view mirror element with a rear view position being adjustable via the actuator arranged on the mirror component.

13. The rear view device of claim 12, wherein the mirror component is a backing plate, and the rear view mirror element is attached to the mirror component.

14. The rear view device of claim 12, wherein the mirror component is fixed to a case frame attached to a housing of the rear view device.

15. A vehicle comprising at least one of the rear view device of claim 12.

16. A method for inserting an actuator into the mirror component of claim 1, comprising:
providing an actuator for adjusting a rear view position of a rear view mirror element in the rear view device, where the actuator comprises an electrical connector;
providing an electrical mating connector to an electrical supply architecture;
inserting the electrical mating connector into the electrical connector to establish a combination of the electrical connector being connected to the electrical mating connector and subsequently an electrical connection between the actuator and the electrical supply architecture;
inserting the connected actuator into an anti-back-out rib element of the mirror component as an element enabling receiving either at least a first combination or a second combination of the electrical connector being connected to the electrical mating connector, where the first and second combinations are differently shaped, and where the combination of the electrical connector being connected to the electrical mating connector is inserted into one position in the anti-back-out rib element dedicated for the particular combination of the electrical connector being connected to the electrical mating connector of the at least two differently shaped combinations; and at least one of
finalizing the attaching in case of the electrical mating connector being inserted into the electrical connector correctly; or
preventing the attaching of the anti-back-out rib element regardless of which of the differently shaped combinations of the electrical connector being connected to the electrical mating connector and being acceptable for the anti-back-out rib element is present in case the electrical connector is incorrectly connected to electrical mating connector.

17. The method of claim 16, further comprising:
checking the combination of the electrical connector connected to the electrical mating connector in case of the previously prevented inserting by the anti-back-out rib element; and
subsequently at least one of
replacing at least one of the electrical connector or the electrical mating connector by another part; and
establishing a correct combination of the electrical connector being connected to the electrical mating connector of a former non-correct combination of the electrical connector being connected to the electrical mating connector.

* * * * *